United States Patent
Gross et al.

(10) Patent No.: US 10,528,212 B2
(45) Date of Patent: Jan. 7, 2020

(54) LOAD RECOMMENDATIONS AND LOAD SECURING RECOMMENDATION FOR A VEHICLE

(71) Applicant: VOLKSWAGEN AG, Wolfsburg (DE)

(72) Inventors: Philipp Gross, Braunschweig (DE); Lutz Oster, Braunschweig (DE)

(73) Assignee: Volkswagen AG (DE)

(*) Notice: Subject to any disclaimer, the term of this patent is extended or adjusted under 35 U.S.C. 154(b) by 265 days.

(21) Appl. No.: 15/210,177

(22) Filed: Jul. 14, 2016

(65) Prior Publication Data

US 2017/0017502 A1  Jan. 19, 2017

(30) Foreign Application Priority Data

Jul. 14, 2015  (DE) .................. 10 2015 213 197

(51) Int. Cl.
  *G06F 3/0481* (2013.01)
  *G06Q 10/04* (2012.01)
  (Continued)

(52) U.S. Cl.
  CPC ............ *G06F 3/0481* (2013.01); *G06F 9/453* (2018.02); *G06Q 10/04* (2013.01); *G06Q 10/08* (2013.01); *G06T 7/60* (2013.01); *H04N 5/232* (2013.01); *G06T 2207/10004* (2013.01); *G06T 2207/30252* (2013.01)

(58) Field of Classification Search
  CPC ........ G07C 2009/0092; G07C 2209/63; G06K 9/00832; G06F 3/0481; G06F 9/453; G06Q 10/04; G06Q 10/08; G06T 7/60; H04N 5/232
  See application file for complete search history.

(56) References Cited

U.S. PATENT DOCUMENTS

2005/0131645 A1* 6/2005 Panopoulos .......... B60P 1/5457
                                                    701/472
2007/0265754 A1* 11/2007 Curtis .................... B60N 2/005
                                                    701/49
(Continued)

FOREIGN PATENT DOCUMENTS

DE      10210575 A1    12/2003
DE   102004006858 A1     9/2005
(Continued)

OTHER PUBLICATIONS

Daub; Printing and Sharing; downloaded from http://www.daubnet.com/de/load-produkttour4; downloaded Mar. 12, 2015.
(Continued)

*Primary Examiner* — Kenny A Cese
(74) *Attorney, Agent, or Firm* — Barnes & Thornburg LLP

(57) ABSTRACT

A method for determining a loading recommendation for a vehicle. The method involves object dimensions of objects with which the vehicle needs to be loaded being determined automatically using an optical capture apparatus, and an arrangement of the objects in a cargo space of the vehicle being determined on the basis of the object dimensions of the objects and a cargo space dimension of the cargo space. The arrangement of the objects in the cargo space is output as a loading recommendation.

13 Claims, 5 Drawing Sheets

(51) Int. Cl.
*G06Q 10/08* (2012.01)
*G06F 9/451* (2018.01)
*G06T 7/60* (2017.01)
*H04N 5/232* (2006.01)

(56) References Cited

U.S. PATENT DOCUMENTS

| | | | | |
|---|---|---|---|---|
| 2012/0053785 A1* | 3/2012 | Wittorf | .................... | B60R 5/04 701/36 |
| 2013/0200645 A1* | 8/2013 | Miller | .................. | B60P 7/0892 296/37.6 |
| 2015/0094876 A1* | 4/2015 | Baldwin | ............... | G06F 16/951 701/1 |
| 2016/0304299 A1* | 10/2016 | Daun | .................... | G06Q 10/08 |

FOREIGN PATENT DOCUMENTS

| | | |
|---|---|---|
| DE | 102005001480 B3 | 10/2006 |
| DE | 102010054343 A1 | 6/2012 |
| DE | 102011016641 A1 | 10/2012 |
| DE | 102011085311 A1 | 6/2013 |
| DE | 102014223031 A1 | 6/2015 |
| WO | WO-2015090739 A1 * | 6/2015 |

OTHER PUBLICATIONS

Daub; The Shipment Wizard optimizes entire packing lists; downloaded from http://daubnet.com/de/load-produkttour2; downloaded Mar. 12, 2015.
Daub; The Shipment Wizard for single package types; downloaded from http://daubnet.com/de/load-produkttour3; downloaded Mar. 12, 2015.
Daub; Container stowage made easy; downloaded from http://www.daubnet.com/de/load-produkttour; downloaded Mar. 12, 2015.
Institute for Applied Optimization IFAP GmbH; Einzelhelten Products; downloaded from http://www.opti.ch/andere_packstuek formen.html; downloaded Mar. 12, 2015.
Institute for Applied Optimization IFAP GmbH; Requirements for the charge (charging rules); downloaded from http://www.opti.ch/ladevorschriften.html; downloaded Mar. 12, 2015.
Institute for Applied Optimization IFAP GmbH; Save material costs with the cutting optimization plan IQ; downloaded from http://www.opti.ch/zuschnittoptimierung.html; downloaded Mar. 12, 2015.
Institute for Applied Optimization IFAP GmbH; Loading and stacking rules; downloaded from http://www.opti.ch/stapelvorschriften.html; downloaded Mar. 12, 2015.
Institute for Applied Optimization IFAP GmbH; The positioning of packages with Cube-IQ; downloaded from http://www.opti.ch/positionierung_von_packstuecken.html; downloaded Mar. 12, 2015.
Institute for Applied Optimization IFAP GmbH; Create a simple readable stowage plan; downloaded from http://www.opti.ch/stauplan-erstellen.html; downloaded Mar. 12, 2015.
Institute for Applied Optimization IFAP GmbH; Cube-IQ; downloaded from http://www.opti.ch/container_definieren.html; downloaded Mar. 12, 2015.
Institute for Applied Optimization IFAP GmbH; Want container optimally loaded, thereby saving money and time?; downloaded from http://www.opti.ch.container_optimal_stauen.html; downloaded Mar. 12, 2015.
Institute for Applied Optimization IFAP GmbH; Defining packages in Cube-IQ; downloaded from http://www.opti.ch.packstuecke_definieren.html; downloaded Mar. 12, 2015.
Institute for Applied Optimization IFAP GmbH; Pallets as charge carriers in Cube-IQ; downloaded from http://www.opti.ch/paletten_definieren.html; downloaded Mar. 12, 2015.
NextCargo; Storage and luggage space program with 3D visualization; downloaded from http://www.nextcargo.com/#PackApp; downloaded Mar. 12, 2015.
NextCargo Presseportal; PackApp; downloaded from http://www.presseportal.de/pm/55416/2465301/packapp-neues-3d-stau . . . ; downloaded Mar. 12, 2015.
EasyCargo; The planning software for your trucks and containers; downloaded from http://www.easycargo3d.com/de/; downloaded Mar. 12, 2015.
Fraunhofer IML; Software Engineering: Puzzle; downloaded from http://www.iml/fraunhofer.de/de/themengebiete/software_engineering/ . . . ; downloaded Mar. 12, 2015.

* cited by examiner

LOAD RECOMMENDATIONS AND LOAD SECURING RECOMMENDATION FOR A VEHICLE

PRIORITY CLAIM

This patent application claims priority to German Patent Application No. 10 2015 213 197.1, filed 14 Jul. 2015, the disclosure of which is incorporated herein by reference in its entirety.

SUMMARY

Illustrative embodiments relate to a method for determining a loading recommendation for a vehicle and to a method for determining a load securing recommendation for a vehicle. Illustrative embodiments relate to a method for determining a loading recommendation that involves object dimensions of objects with which the vehicle needs to be loaded being determined automatically using an optical capture apparatus.

BRIEF DESCRIPTION OF THE DRAWINGS

Disclosed embodiments are described in detail below with reference to the figures.

DETAILED DESCRIPTION

Figure 1:
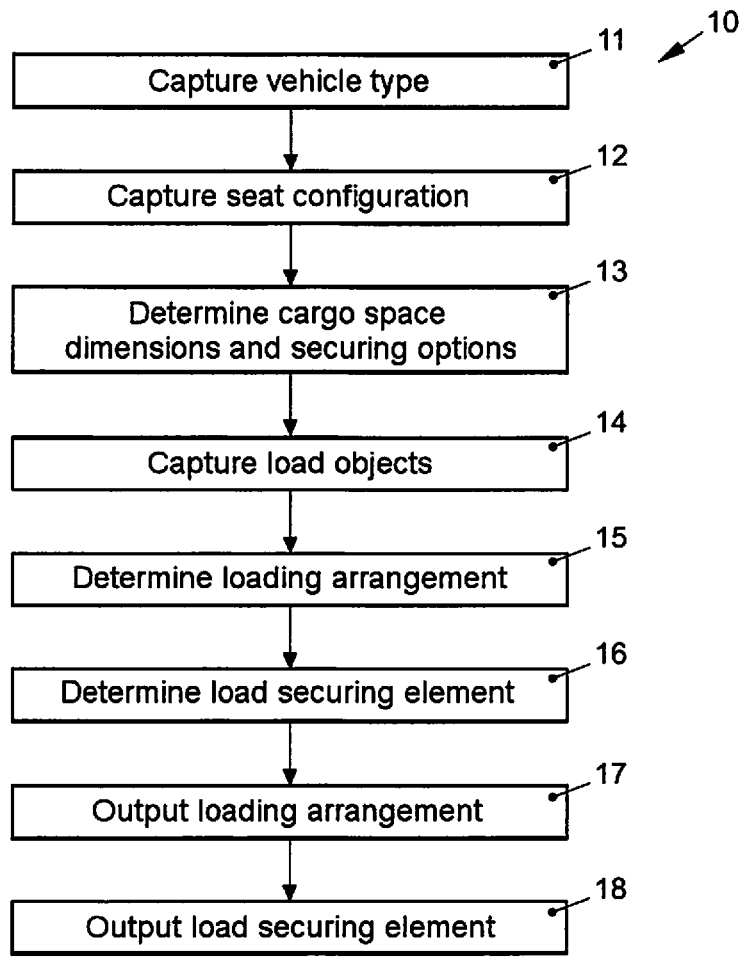
FIG. 1 shows method operations of a method according to a disclosed embodiment.

Loading a vehicle, for example, an automobile or a truck, with objects, for example, luggage items or freight items, requires a planning activity to be able to use the cargo space of the vehicle efficiently and to ensure secure transport of the objects. To assist in this loading planning, there are, particularly for trucks and containers, planning tools available as application programs, for example, on the Internet, which can be implemented on portable apparatuses, for example, what are known as tablet PCs, and provide a visual display for an instance of loading. This can take account of different constraints, such as axle loads or restrictions of the cargo space and a loading and unloading order, for example.

The available planning programs are oriented essentially to transports in the conveyance of goods, however, and there is therefore a need for improved planning software that provides a valuable aid particularly also for loading automobiles.

Disclosed embodiments provide a method for determining a loading recommendation for a vehicle, a method for determining a load securing recommendation for a vehicle, an apparatus for determining a loading recommendation for a vehicle, an apparatus for determining a load securing recommendation for a vehicle, and a computer program product.

Disclosed embodiments provide a method for determining a loading recommendation for a vehicle. The disclosed method involves object dimensions of objects with which the vehicle needs to be loaded being determined. The object dimensions of the objects are determined automatically using an optical capture apparatus. On the basis of the object dimensions of the objects and a cargo space dimension of a cargo space of the vehicle, an arrangement of the objects in the cargo space of the vehicle is determined automatically. This arrangement of the objects in the cargo space of the vehicle is output as a loading recommendation. By way of example, the method can be performed on a mobile terminal, for example, a smartphone or a tablet PC, or another computer system. The ascertained arrangement of the objects in the cargo space can be output as a graphical, three-dimensional representation, for example. The objects can comprise luggage items or other packages, for example, that need to be loaded into the cargo space of the vehicle. The cargo space of the vehicle can comprise a trunk of an automobile or a cargo area of a delivery van, for example. Since the object dimensions of the objects are determined automatically using the optical capture apparatus, complex measurement of the objects and corresponding input of the measurements of the objects can be avoided. As a result, the method can be used for loading an automobile or a small truck, for example, for packing an automobile for a vacation trip or for loading a delivery vehicle with packages of different shape and size that are to be delivered.

According to at least one disclosed embodiment, the object dimensions of the objects with which the vehicle needs to be loaded are determined by capturing an image of one or more of the objects using the optical capture apparatus. The dimensions of the object are determined from the captured image. By way of example, the optical capture apparatus can comprise a camera that provides a piece of distance information for a distance between the camera and the object. By taking account of information from the lens system of the camera and the distance between the camera and the object, it is possible to determine the dimensions of the object. Alternatively, or additionally, an object or multiple objects from the objects to be loaded, together with a determined reference object, can be captured using the optical capture apparatus. The reference object can comprise a vehicle key, a parking disk or the like, for example, so that the dimensions of the reference object are known. As a result, there is a scale available in the image of the object or of the multiple objects, so that the dimensions of the object or of the multiple objects can be determined from the image in conjunction with the reference object.

In a further disclosed embodiment, the object dimensions of the objects with which the vehicle needs to be loaded are determined by using the optical capture apparatus to capture an optical code that is affixed to the respective object. The optical code may be a barcode or a 2D code, for example. The dimensions of the object are then determined on the basis of the optical code. By way of example, an optical code may be present on a package, a case or another article. From a database that is accessed via the Internet, for example, the dimensions can be retrieved on the basis of the optical code. Hence, the dimensions of the objects that need to be loaded into the cargo space of the vehicle can be determined reliably and in a simple manner.

Alternatively, or additionally, it is also possible for an item number that is indicated on the object to be captured optically and the dimensions of the object can be determined on the basis of the item number. Further, the item number can be adopted directly from electronically available data, for example, from an order for the object, and the dimensions of the object can be determined on the basis of the item number.

Disclosed embodiments provide a method for determining a load securing recommendation for a vehicle. The method involves object dimensions of objects with which the vehicle needs to be loaded being determined and an arrangement of the objects in a cargo space of the vehicle being determined on the basis of the object dimensions of the objects and a cargo space dimension of the cargo space. On the basis of the arrangement of the objects in the cargo space, a securing element for the objects arranged in the cargo space is determined. The securing element is designed such that it restricts a movement of the objects in the cargo space. The securing element can comprise transport nets, transport straps at particular attachment points in the vehicle or safety belts of the vehicle, for example. The thus determined securing element for the objects is output as a load securing recommendation. Since not only the arrangement for the loading but also a load securing element are determined, it is possible for secure transport of the objects in the vehicle to be achieved.

According to at least one disclosed embodiment, the securing element for the objects arranged in the cargo space is determined by capturing a vehicle identification attribute of the vehicle and, on the basis thereof, determining securing options in the cargo space of the vehicle. The securing element for the objects arranged in the cargo space is ascertained on the basis of the determined securing options. The vehicle identification attribute can comprise a vehicle make and the vehicle type or vehicle identification number, for example. As a result, securing options, such as attachment points for tightening straps or transport nets, for example, can be reliably ascertained in a simple manner and taken into account for determining the securing element for the objects arranged in the cargo space.

According to a further disclosed embodiment, both the method for determining the loading recommendation and the method for determining the load securing recommendation can additionally involve determining weights of the objects with which the vehicle needs to be loaded. The arrangement of the objects in the cargo space is additionally determined on the basis of the weights of the objects. By way of example, the arrangement of the objects can involve heavier objects being arranged nearer the bottom and lighter objects being arranged nearer the top. Furthermore, heavier objects can be arranged in areas that have load securing options with greater load-bearing capacity, whereas lighter objects are arranged in areas that are secured merely by a safety net, for example.

In a further disclosed embodiment, the aforementioned methods can additionally involve weights of the objects with which the vehicle needs to be loaded being determined and a setting for a headlamp orientation of the vehicle being determined on the basis of the weights of the objects and the arrangement of the objects in the cargo space. The thus determined setting for the headlamp orientation can be output as a recommendation for setting a headlamp level adjuster, for example, and a user of the vehicle can set a corresponding headlamp level adjuster. This can prevent other road users from being dazzled by headlamps of the vehicle in the loaded state.

Further, the method can additionally involve centers of gravity of the objects with which the vehicle needs to be loaded being determined. The centers of gravity of the objects can be input by a user using a graphical user interface, for example, by touching the approximate center of gravity after the objects have been optically captured and graphically presented. The arrangement of the objects in the cargo space is additionally determined on the basis of the centers of gravity of the objects. By way of example, the effect that can be achieved by this is that the objects, when arranged in the cargo space in accordance with the determined arrangement, are stowed in a stable manner, so that tilting of the objects, for example, during braking or cornering or acceleration, can be avoided.

The methods described above can be extended to the effect that additionally a loading order in which the objects need to be loaded into the cargo space is determined and this determined loading order is output. This allows loading of the vehicle to be distinctly simplified and speeded up.

According to at least one disclosed embodiment, the cargo space dimensions of the cargo space of the vehicle are determined by capturing a vehicle identification attribute of the vehicle and ascertaining the cargo space dimensions on the basis of the vehicle identification attribute from a database, for example. The vehicle identification attribute, for example, vehicle manufacturer and vehicle type or a vehicle identification number, can be input by a user of the vehicle, for example. This allows exact cargo space dimensions for the cargo space of the vehicle to be provided in a simple manner, so that a computation for the arrangement of the objects that need to be loaded into the cargo space can be performed with a high degree of accuracy.

In addition, a seat configuration of the vehicle can be captured and the cargo space dimension of the cargo space in the vehicle can be determined on the basis of the seat configuration. In many vehicles, the cargo space can be organized in a variable manner by tilting or removing seats. An appropriate, for example, graphical, user interface can be used by a user to input the current or desired seat configuration of the vehicle, for example, and this seat configuration can be taken into account for determining the loading recommendation or load securing recommendation.

Disclosed embodiments provide an apparatus for determining a loading recommendation for a vehicle. The apparatus comprises an optical capture apparatus, for example, a camera, a graphical user interface and a processing apparatus. The processing apparatus is capable of determining object dimensions of objects with which the vehicle needs to be loaded automatically using the optical capture apparatus. On the basis of the object dimensions of the objects and a cargo space dimension of a cargo space of the vehicle, the processing apparatus is capable of determining an arrangement of the objects in the cargo space of the vehicle. The arrangement of the objects in the cargo space is output by the processing apparatus as a loading recommendation via the graphical user interface. By way of example, the apparatus may be a smartphone or a tablet PC, so that the camera of the smartphone or of the tablet PC can be used as an optical capture apparatus. The graphical user interface used can be the touch-sensitive screen of the smartphone or of the tablet PC. This allows the loading recommendation, for example, for packing a vehicle for a vacation trip, to be determined in a simple manner and taken into account by a user when loading the vehicle. Further, the apparatus is suitable for performing the previously described method and its disclosed embodiments and also comprises the previously described benefits.

Disclosed embodiments provide a further apparatus that is used for determining a load securing recommendation for a vehicle. The apparatus comprises a graphical user interface and a processing apparatus that is capable of determining object dimensions of objects with which the vehicle needs to be loaded and of determining an arrangement of the objects in a cargo space of the vehicle on the basis of the object dimensions of the objects and a cargo space dimension of the cargo space. The processing apparatus is further designed to determine a securing element for the objects arranged in the cargo space on the basis of the arrangement of the objects in the cargo space and to output the securing element for the objects as a load securing recommendation via the graphical user interface. In this case, the securing element is used to restrict a movement of the objects in the cargo space. The apparatus is therefore suitable for performing the previously described methods and therefore also comprises the previously described benefits. The apparatus may particularly be a portable apparatus, such as a smartphone or a tablet PC, for example, so that determination of the load securing recommendation can be performed when loading the vehicle and the relevant load securing element can be set up while it is output to a user as a load securing recommendation via the graphical user interface.

Finally, the disclosed embodiments provide a computer program product that comprises a program and is loadable directly into a memory of a programmable apparatus. The computer program product comprises program means to perform all the operations of the previously described methods when the program is executed in the programmable apparatus. By way of example, the programmable apparatus may be a processor of a portable apparatus, particularly of a smartphone or tablet PC. The computer program product may therefore be what is known as an app that is loaded onto the smartphone or the tablet PC to determine a loading recommendation and/or a load securing recommendation and to output it to the user.

Although the above disclosed embodiments have been described independently of one another, they can be combined with one another arbitrarily.

Figure 2:
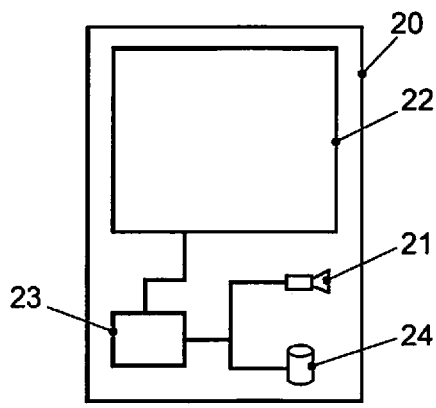
FIG. 2 schematically shows an apparatus according to a disclosed embodiment.

FIG. 1 shows a method 10 for determining a loading recommendation and a load securing recommendation for a vehicle. The method comprises method operations 11-18. The method 10 can be performed by an apparatus 20, for example, which is shown in FIG. 2. By way of example, the apparatus 20 may be a mobile terminal, such as a smartphone or tablet PC. The apparatus 20 comprises an optical capture apparatus 21, a graphical user interface 22, a processing apparatus 23 and a memory 24 for storing data and programs, what are known as apps. By way of example, the optical capture apparatus 21 may be a camera, which is mounted on a reverse of the apparatus 20, for example, and is capable of optically capturing an image of a surrounding area of the apparatus 20. By way of example, the graphical user interface 22 may comprise what is known as a touchscreen, which comprises a touch-sensitive surface and a graphical display apparatus. By way of example, the processing apparatus 23 may comprise a microprocessor or a microcontroller that is designed to execute a program stored in the memory 24, as a result of which operations 11-18 of the method 10 are performed when the program is executed in the processing apparatus 23.

Figure 3:
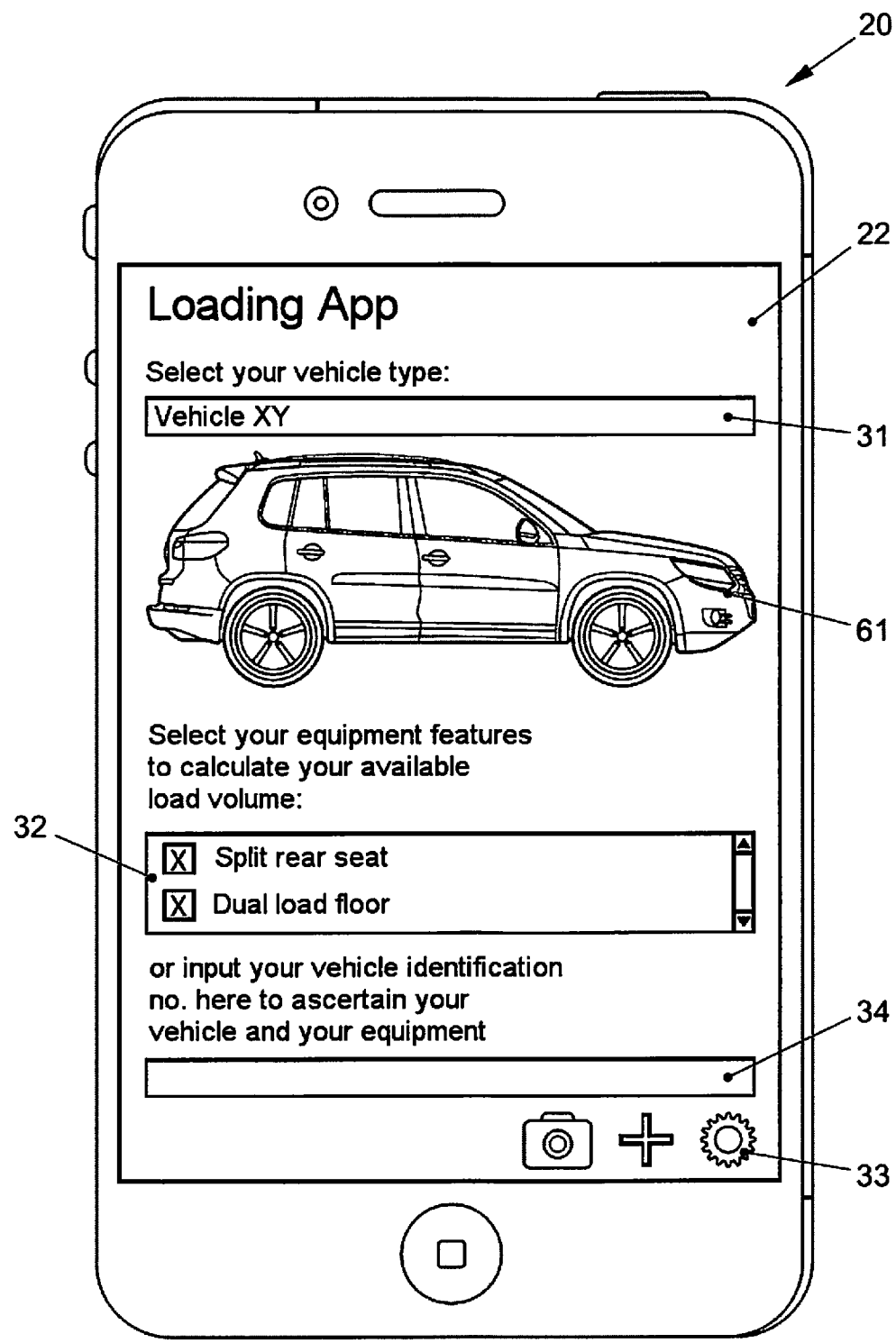
FIG. 3 shows output on a graphical user interface according to a disclosed embodiment.

In the case of the method 10 shown in FIG. 1, operation 11 involves a vehicle type of a vehicle that needs to be loaded being captured. FIG. 3 shows a corresponding output on the graphical user interface 22 of the apparatus 20. In a field 31, it is possible to use what is known as a pull down menu, for example, to select a vehicle type from a prescribed list. A representation of the vehicle 61 to be loaded can be displayed on the graphical user interface. Particular equipment features of the selected vehicle type that influence the cargo space can additionally be requested. By way of example, a user can use a field 32 to specify equipment variants of the selected vehicle. By way of example, field 32 can comprise a selection menu field in which the relevant equipment features are listed and selectable, for example, whether the vehicle 61 has a split rear seat and/or whether the vehicle 61 has a dual loading floor. The equipment features selected in field 32 can be taken into account by means of an "or" function when determining the available loading volume. Alternatively, a vehicle identification number can be input in a field 34 by a user or can be captured using the optical capture apparatus 21 and presented in field 34. A server query, for example, can be used to retrieve loading-volume-relevant features of the vehicle 61 on the basis of the vehicle identification number, such as, for example, whether the rear seat is split, which seats are foldable and which securing options are provided for load securing in the vehicle 61, for example, where anchoring points for tightening straps are provided and whether a transport net is present or fittable. The thus specified vehicle type can be stored permanently in the memory 24, so that this vehicle information can be provided upon further use of the method.

In a menu, not shown, which can be called by operating the symbol 33, for example, it is possible for general settings to be made, for example, language selection for the user interface or what system of measurement, e.g., metric or Anglo-American, is intended to be used for lengths, volumes and weights on the user interface. In the present description, the German language and metric units (meters, liters and kilograms) are used for the user interface. With other settings, the English language and Anglo-American units (e.g., inches, cubic feet and pounds) can be used, for example.

Figure 4:
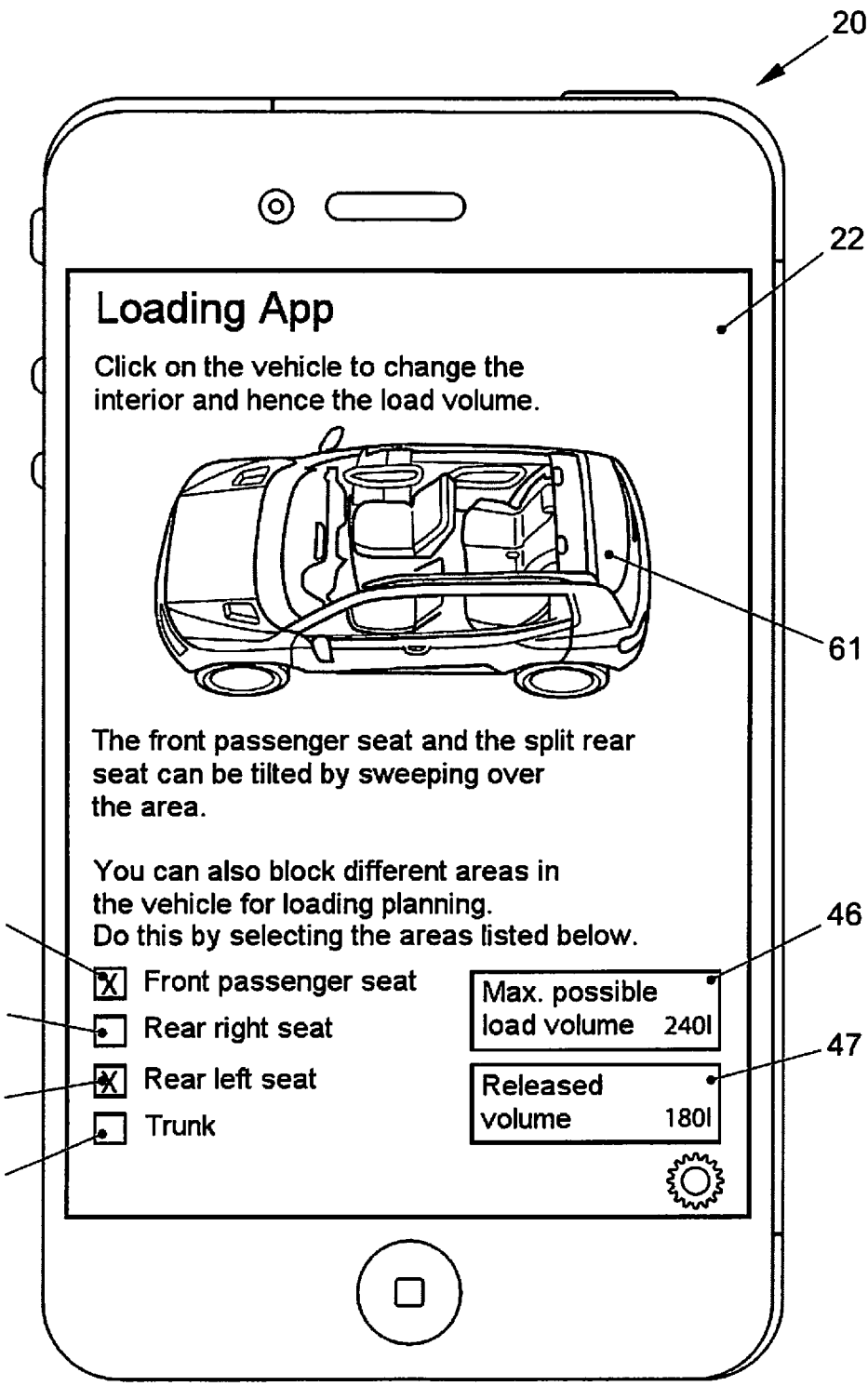
FIG. 4 shows output on a graphical user interface according to a disclosed embodiment.

Operation 12 of the method 10 involves a desired seat configuration being captured. FIG. 4 shows a corresponding output on the graphical user interface 22 of the apparatus 20. On the basis of which seats can be folded and which seats are released for loading purposes, the maximum possible loading volume changes. Folding seats can be tilted or set upright by sweeping over the relevant seat areas in a representation of the vehicle 61, for example. Areas in the vehicle 61 that are not intended to be taken into account by the loading planning and are therefore blocked for loading can be configured using fields 42-45, for example. The maximum possible loading volume when all available areas in the vehicle 61 are exhausted can be displayed in field 46, for example, and the volume that is actually released at present, which is obtained by taking into account the input fields 42-45, can be displayed in field 47. On the basis of the vehicle type and the seat configuration described above, the cargo space dimensions that are relevant to loading can be determined in operation 13. Further, securing options for securing the load can be determined in operation 13. Furthermore, it is also possible, by way of example, for the maximum permissible extra load weight to be determined, for example, by taking into account the number of passengers, which is obtained from the seats that are blocked for loading.

Figure 5:
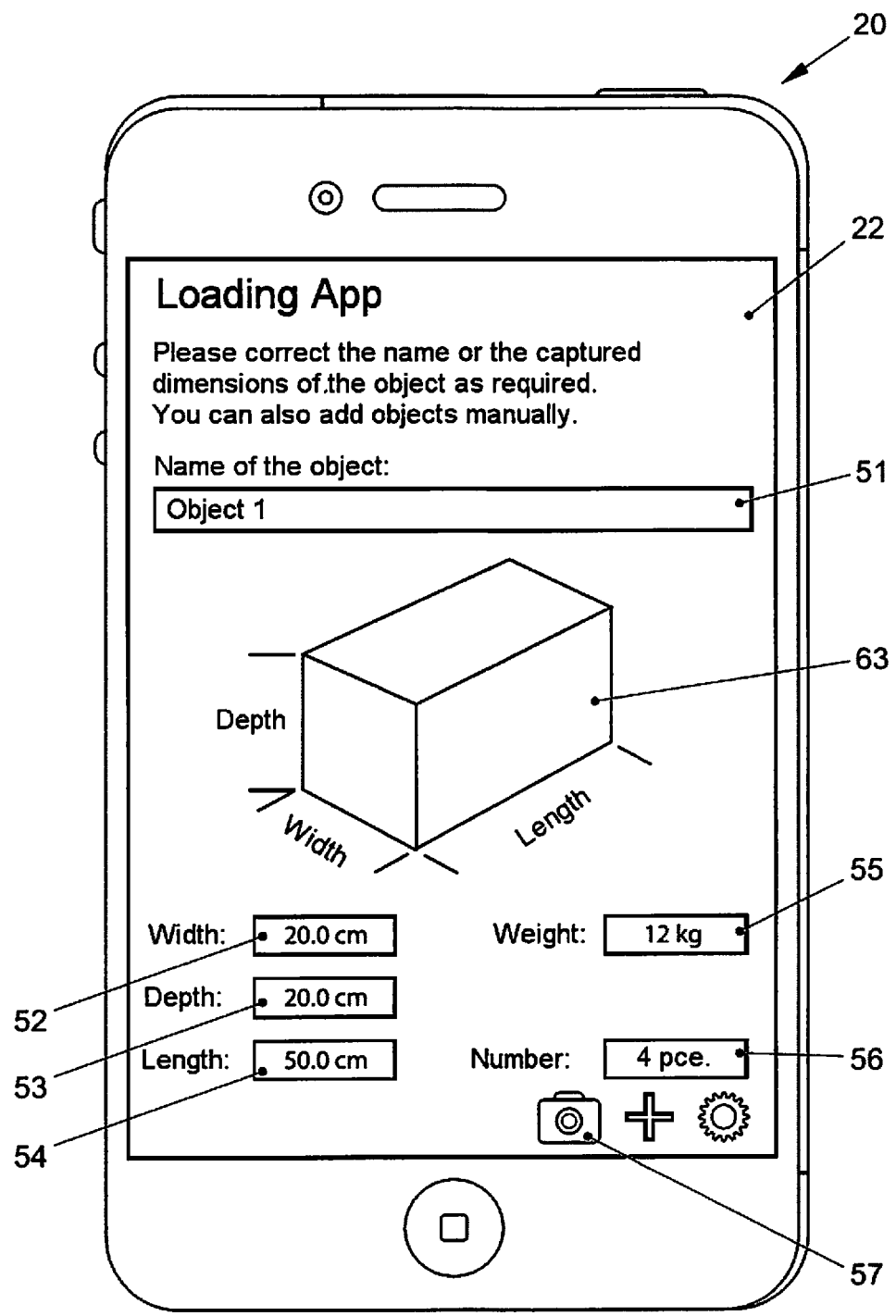
FIG. 5 shows output on a graphical user interface according to a disclosed embodiment.

Operation 14 of the method 10 involves the objects that need to be loaded into the vehicle 61 being captured. FIG. 5 shows a corresponding output on the graphical user interface 22 of the apparatus 20. It is possible for multiple objects to be captured. Each object 63 can be given a name using a field 51. A size of the object 63 can be configured manually using fields 52-54. Similarly, the weight of the object 63 can be set using a field 55. If multiple objects of the same size and the same weight are intended to be loaded, then the number can be set using a field 56. Alternatively or additionally, objects that need to be loaded into the vehicle can be optically captured using the optical capture apparatus 21, for example, by operating a camera symbol 57 while the camera of the apparatus 20 is pointed at the object. Using image analysis, the dimensions of the object can be ascertained. By way of example, this can involve the use of a distance between the camera and the object in conjunction with optical properties of the camera. Alternatively or additionally, a reference object of known size can be arranged on or beside the object while the object is captured by the camera. The reference object can comprise a parking disk, a vehicle key or a reference template, for example. The dimensions ascertained by analysis of the image of the object are displayed in fields 52-54 and can be corrected by the user if required. Further, a graphical representation of the captured object 63 can be displayed. If the object 63 is provided with a barcode or 2D code or another optical code, then this code can be recorded by the optical capture apparatus 21 and the code can be used to retrieve information pertaining to the object 63 from a database, for example, via the Internet. This information can comprise dimensions of the object 63 and a weight of the object 63, for example, which can then be displayed in fields 52-55.

Following capture of the objects that need to be loaded into the vehicle, operation 15 of the method 10 involves a loading arrangement being determined automatically. In at least one disclosed embodiment, the dimensions of the objects can be assumed to be cubic measurements and an appropriate loading arrangement can be ascertained. Furthermore, the loadability as a whole can be determined and an appropriate report can be output if loading of the captured objects is not possible. In another disclosed embodiment, the exact shape of the objects to be loaded can be taken into account, so that an optimized packing concept can be ascertained. Furthermore, a loading order can be ascertained, which assists the user in arranging the objects in the planned loading arrangement in the vehicle. When the loading arrangement is determined, it is also possible for the weight of the individual objects to be taken into account, so that heavier objects are arranged nearer the bottom, whereas lighter objects are arranged nearer the top, for example. The center of gravity of objects can also be taken into account for the arrangement of the objects. To capture the centers of gravity, the user can mark the center of gravity of the object 63 in the image of the object 63, for example, in the output shown in FIG. 5, for example, by a touch.

Operation 16 of the method 10 additionally involves a load securing element being determined automatically. On the basis of the arrangement of the objects in the cargo space of the vehicle and an arrangement of attachment points for transport securing elements, such as transport nets or tightening straps, for example, and taking into account the weight of the individual objects, it is possible to determine a load securing element that prevents the objects from moving in the cargo space when acceleration forces act on the objects as a result of the journey by the vehicle.

Figure 6:
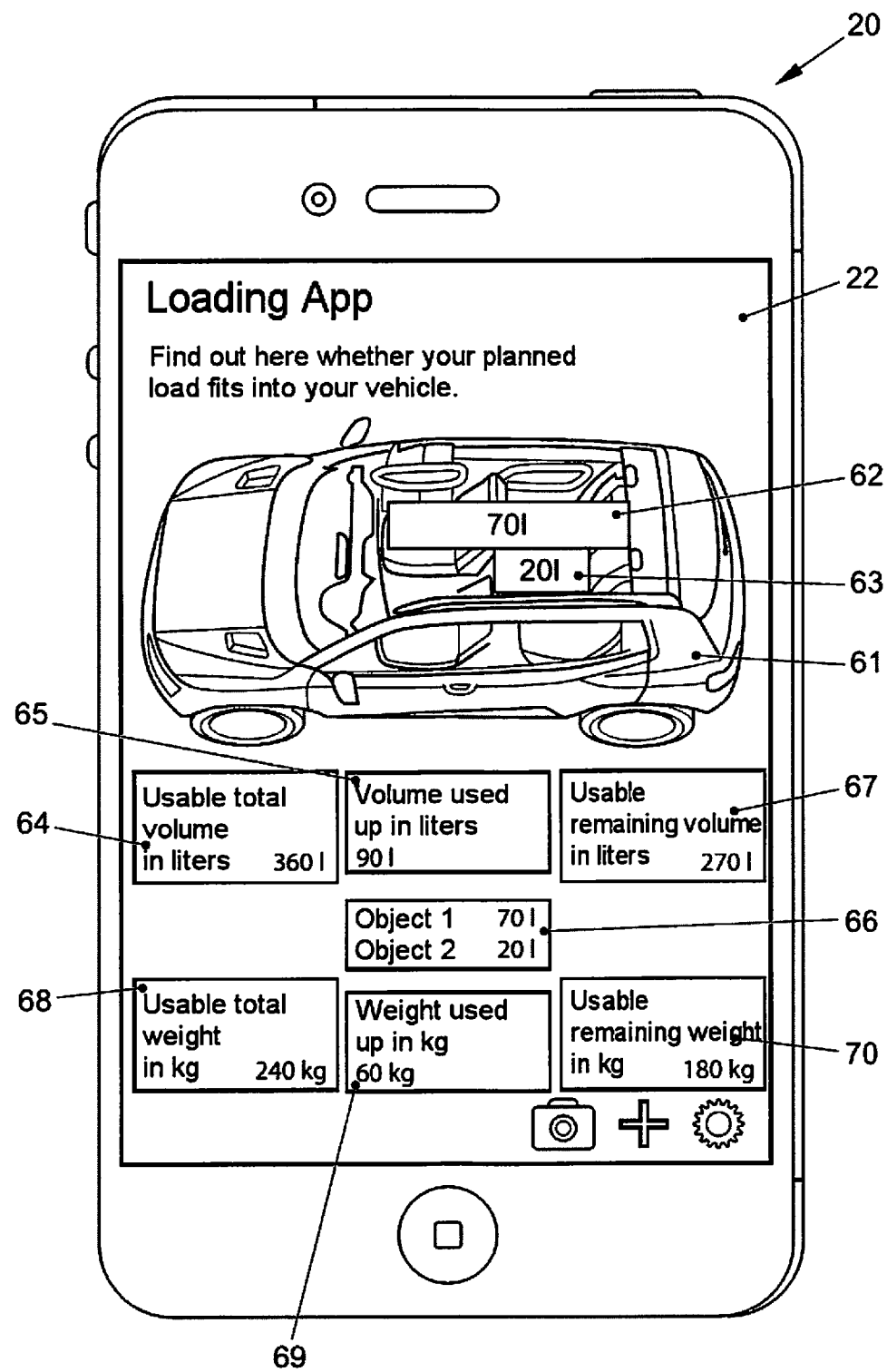
FIG. 6 shows output on a graphical user interface according to a disclosed embodiment.

Operation 17 of the method 10 involves the thus determined loading arrangement being output to the user, for example, in graphical form. FIG. 6 shows a corresponding output on the graphical user interface 22 of the apparatus 20. In a representation of the vehicle 61, the arrangement of two objects 62 and 63 is presented graphically by way of example. The sizes of the respective objects in liters are additionally displayed. Further information that relates to the loading is presented in fields 64-70. Field 64 shows the total available or usable volume of the cargo space for the chosen seat configuration, field 65 shows the volume currently used up by the objects 62, 63 and field 66 shows the volumes of the individual objects. From the usable total volume and the volume currently used up, a useable remaining volume is obtained, which is displayed in field 67. Field 68 displays the usable total weight for the extra load in kilograms. Field 69 shows the weight currently used up by the objects 62, 63, and field 70 displays the available remaining weight. If need be, an overload is displayed if the weight used up exceeds the available total weight. When the user is satisfied with the chosen arrangement of the objects and does not wish to add any further objects, an operation-by-operation animated cargo space preparation and packaging recommendation can be output. By way of example, the animated cargo space preparation comprises folding and movement of seats or of the rear seat, and the packing recommendation comprises an order in which the objects 62, 63 need to be loaded into the vehicle 61, for example, and also orientations of the objects 62, 63 during loading, such as angling, rotation and the final position of the object, for example. Finally, operation 18 of the method 10 can involve a load securing element being output. By way of example, an appropriate representation of the vehicle 61 can have recommendations displayed in it for how transport nets need to be fitted or how tightening straps need to be fitted, for example.

The loading recommendation and/or the load securing recommendation can alternatively or additionally be expressed by sending the loading recommendation and/or the load securing recommendation via a radio interface, e.g., WLAN or Bluetooth, from the apparatus 20 to a printer, for example.

On the basis of the weight used up by the objects, it is additionally possible to output a recommendation for manual adjustment of a headlamp level of the vehicle, for example.

The method operations described above can be performed in the order described above. However, it is also possible for the user to skip to and fro between the individual method operations as desired at any time, for example, to change the seat configuration after some objects have already been input. In addition, the optical capture of the object dimensions using the optical capture apparatus can involve multiple objects being captured, and hence the dimensions thereof being set, simultaneously. In addition, the method described above is not limited to applications linked to automobiles, but rather can also be used in connection with trucks or transport vehicles.

LIST OF REFERENCE SYMBOLS

10 Method
11-18 Operation
20 Apparatus
21 Optical capture apparatus
22 Graphical user interface
23 Processing apparatus
24 Memory
31 Field
32 Field
33 Symbol
34 Field
42-47 Field
51-56 Field
57 Camera symbol
61 Vehicle
62,63 Object
64-70 Field

The invention claimed is:

1. A method for determining a load securing recommendation for a vehicle, the method comprising:
   determining object dimensions of objects to be loaded in the vehicle;
   determining, by a processor, an arrangement of the objects in a cargo space of the vehicle based on the object dimensions of the objects and a cargo space dimension of the cargo space;
   determining, by the processor, at least two different securing options in the cargo space,
   determining, by the processor, a securing element for the objects arranged in the cargo space based on the arrangement of the objects in the cargo space and the at least two different securing options, wherein the securing element is adapted to restrict a movement of the objects in the cargo space; and
   outputting a recommendation of the determined securing element for the objects as a load securing recommendation onto a display to communicate the recommendation to a user.

2. The method of claim 1, wherein determining the securing element for the objects arranged in the cargo space comprises:
   capturing a vehicle identification attribute of the vehicle; and
   determining the at least two different securing options in the cargo space of the vehicle based on the vehicle identification attribute, and
   determining the securing element for the objects arranged in the cargo space additionally based on the determined securing options.

3. The method of claim 1, further comprising:
   determining weights of the objects with which the vehicle needs to be loaded; and
   determining the arrangement of the objects in the cargo space additionally based on the weights of the objects.

4. The method of claim 1, further comprising:
   determining a loading order in which the objects need to be loaded into the cargo space; and
   outputting the determined loading order.

5. The method of claim 1, further comprising:
   capturing a vehicle identification attribute of the vehicle; and
   determining the cargo space dimension of the cargo space of the vehicle based on the vehicle identification attribute.

6. The method of claim 1, further comprising:
   capturing a seat configuration of the vehicle; and
   determining the cargo space dimension of the cargo space of the vehicle based on the seat configuration.

7. A method for determining a load securing recommendation for a vehicle, the method comprising:
   determining object dimensions of objects to be loaded in the vehicle;
   determining an arrangement of the objects in a cargo space of the vehicle based on the object dimensions of the objects and a cargo space dimension of the cargo space;
   determining a number of securing options in the cargo space based on the determined arrangement of objects,
   determining a securing element for the objects arranged in the cargo space based on the arrangement of the objects in the cargo space and the number of securing options, wherein the securing element is adapted to restrict a movement of the objects in the cargo space;
   outputting a recommendation of the determined securing element for the objects as a load securing recommendation onto a display to communicate the recommendation to a user;
   determining weights of the objects with which the vehicle needs to be loaded; and
   determining a setting for a headlamp orientation of the vehicle based on the weights of the objects and the arrangement of the objects in the cargo space.

8. An apparatus for determining a load securing recommendation for a vehicle, the apparatus comprising:
   a graphical user interface; and
   a processing apparatus designed to:
      determine object dimensions of objects with which the vehicle needs to be loaded,
      determine an arrangement of the objects in a cargo space of the vehicle based on the object dimensions of the objects and a cargo space dimension of the cargo space,
      determine at least two different securing options in the cargo space based on the determined arrangement of objects, and
      determine a securing element for the objects arranged in the cargo space based on the arrangement of the objects in the cargo space and the at least two different securing options,
   wherein the securing element is adapted to restrict a movement of the objects in the cargo space, and
   wherein the processor apparatus is adapted to output a recommendation of the determined securing element for the objects as a load securing recommendation for communication to a user via the graphical user interface.

9. A non-transitory computer readable medium including instructions to perform operations when executed in a programmable apparatus, the operations including:
   determining object dimensions of objects with which the vehicle needs to be loaded; and
   determining an arrangement of the objects in a cargo space of the vehicle based on the object dimensions of the objects and a cargo space dimension of the cargo space,
   determining a securing element for the objects arranged in the cargo space based on the arrangement of the objects in the cargo space, wherein the securing element is adapted for restricting a movement of the objects in the cargo space;
   outputting a recommendation of the determined securing element for the objects as a load securing recommendation,
   determining weights of the objects with which the vehicle needs to be loaded; and
   determining a setting for a headlamp orientation of the vehicle based on the weights of the objects and the arrangement of the objects in the cargo space.

10. The non-transitory computer readable medium of claim 9, wherein determining the securing element for the objects arranged in the cargo space comprises:
    capturing a vehicle identification attribute of the vehicle;
    determining securing options in the cargo space of the vehicle based on the vehicle identification attribute; and
    determining the securing element for the objects arranged in the cargo space additionally based on the determined securing options.

11. The non-transitory computer readable medium of claim 9, wherein the operations further comprises:

determining weights of the objects with which the vehicle needs to be loaded; and determining the arrangement of the objects in the cargo space additionally based on the weights of the objects.

12. The non-transitory computer readable medium of claim 9, wherein the operations further comprise:

determining a loading order in which the objects need to be loaded into the cargo space; and outputting the determined loading order.

13. The non-transitory computer readable medium of claim 9, wherein the operations further comprise:

capturing a vehicle identification attribute of the vehicle; and determining the cargo space dimension of the cargo space of the vehicle based on the vehicle identification attribute.

\* \* \* \* \*